United States Patent
Kokkosoulis et al.

(10) Patent No.: US 6,661,464 B1
(45) Date of Patent: Dec. 9, 2003

(54) DYNAMIC VIDEO DE-INTERLACING

(75) Inventors: George D. Kokkosoulis, Austin, TX (US); Daniel A. Temple, Austin, TX (US)

(73) Assignee: Dell Products L.P., Round Rock, TX (US)

( * ) Notice: Subject to any disclaimer, the term of this patent is extended or adjusted under 35 U.S.C. 154(b) by 422 days.

(21) Appl. No.: 09/721,033

(22) Filed: Nov. 21, 2000

(51) Int. Cl.$^7$ ............................................... H04N 71/01
(52) U.S. Cl. .................................. 348/448; 348/452
(58) Field of Search .............................. 348/452, 448, 348/701, 700, 699, 554

(56) References Cited

U.S. PATENT DOCUMENTS

| | | | | |
|---|---|---|---|---|
| 5,642,171 A | | 6/1997 | Baumgartner et al. ...... 348/515 |
| 5,864,369 A | * | 1/1999 | Swan ......................... 348/448 |
| 6,034,733 A | * | 3/2000 | Balram et al. ............... 348/448 |
| 6,229,850 B1 | * | 5/2001 | Linzer et al. ........... 375/240.11 |
| 6,269,484 B1 | * | 7/2001 | Simsic et al. ............... 348/448 |
| 6,442,203 B1 | * | 8/2002 | Demos ................... 375/240.16 |
| 6,459,455 B1 | * | 10/2002 | Jiang et al. ................. 348/452 |
| 6,473,460 B1 | * | 10/2002 | Topper .................. 375/240.16 |

OTHER PUBLICATIONS

"Solutions to Common Video Artifacts" (Sep. 28, 1999), http://msdn.microsoft.com/library/psdk/directx/ddover_3po7.htm (Copy Enclosed).

"Display Problems for Video" (Jun. 16, 1999), http://www-.microsoft.com/DDK/DDKdocs/win98ddkddddk_0r7b.htm (Copy enclosed).

Khanh T. Nguyen; Video Data Error Detection; filed Jan. 25, 2000; Ser. No. 09/491,071; 20 pages of Specification (including claims & abstract). (Copy Enclosed).

Roy Stedman; Single–Pass Color Quantization for Graphic Images; 11 pages of Specification (including claims & abstract. (Copy Enclosed).

* cited by examiner

*Primary Examiner*—Victor R. Kostak
(74) *Attorney, Agent, or Firm*—Hamilton & Terrile, LLP; Robert W. Holland

(57) ABSTRACT

The invention relates to a process for an improved video display. Depending on the amount of motion contained in the video data, either the bob or the weave method of de-interlacing is used. If video data is in the progressive format, then no de-interlacing is used. After initially determining which method of de-interlacing to use, the invention continues to monitor the amount of motion in the data and changes the de-interlacing method if the amount of motion in the video data changes.

20 Claims, 5 Drawing Sheets

DYNAMIC VIDEO DE-INTERLACING

BACKGROUND

1. Field of the Invention

A process for improving the quality of video display.

2. Description of the Related Art

Computer systems are information handling electronic systems that can be designed to give independent computing power to one user or a plurality of users. Computer systems may be found in many forms including mainframes, minicomputers, workstations, servers, personal computers, internet terminals, notebooks, and embedded systems. A typical computer system includes at least one system processor, associated memory and control logic, and peripheral devices that provide input and output for the system. Peripheral devices may also include displays, keyboards, mouse-type input devices, floppy and hard disk drives, printers, network access circuits, terminal devices, modems, televisions, sound devices, voice recognition devices, electronic pen devices, and mass storage devices such as tape drives, CD-R drives, or DVDs.

As a peripheral, a DVD may store digital video images. The digital images may be read from the DVD and displayed to the computer monitor. Similarly, a DVD may also be utilized as storage device for images to be displayed on a television. But conventional televisions are analog devices unlike newer televisions and computer monitors which display digital images. Images which were originally recorded to be displayed on a standard analog television are processed according to an industry standard.

The National Television Systems Committee (NTSC) standard divides one second of video time into thirty equal segments called frames. Each frame is divided into 2 segments called fields. When displayed on a conventional analog television, the scan lines of the even numbered fields fall between the scan lines of the odd-numbered fields. However, because of the phosphor persistence of a television monitor, two fields are never displayed at the same time. The viewer is always looking at either an even field or an odd field, never at both. However, on a digital display (a computer monitor or digital television) lines typically are displayed as a frame. Therefore, any material intended for display on an analog television must be processed before being displayed on a computer monitor or digital television which usually provide a superior image.

Conventional analog television broadcasts are available in most areas, but random electronic signals interfere with reception. The Federal Communication Commission has ruled that analog signals may not be broadcast after 2006. Thus, within 5 years, analog broadcast signals will be replaced by digital broad casts. Currently, digital signals are standard for commercial satellite and cable television transmissions.

Digital display of video images interlaced for display on a conventional television results in a poor image. The developing technology of digital television and the use of digital monitors for computer systems creates a need for an improved system of de-interlacing video signals which have been recorded for display on a conventional (analog) television.

SUMMARY

The present invention relates to a process for de-interlacing video data. Depending on the amount of motion contained in the video data, either the bob or the weave method of de-interlacing is used. If video data is in the progressive format, then no de-interlacing is used. After initially determining which method of de-interlacing to use, the invention continues to monitor the amount of motion in the data and changes the de-interlacing method if the amount of motion in the video data changes.

The foregoing is a summary and this contains, by necessity, simplifications, generalizations and omissions of detail; consequently, those skilled in the art will appreciate that the summary is illustrative only and is not intended to be in any way limiting.

BRIEF DESCRIPTION OF THE DRAWINGS

The present invention may be better understood, and its numerous objects, features, and advantages made apparent to those skilled in the art by referencing the accompanying drawings. The use of the same reference symbols in different drawings indicates similar or identical items.

DETAILED DESCRIPTION

Introduction

Figure 1:
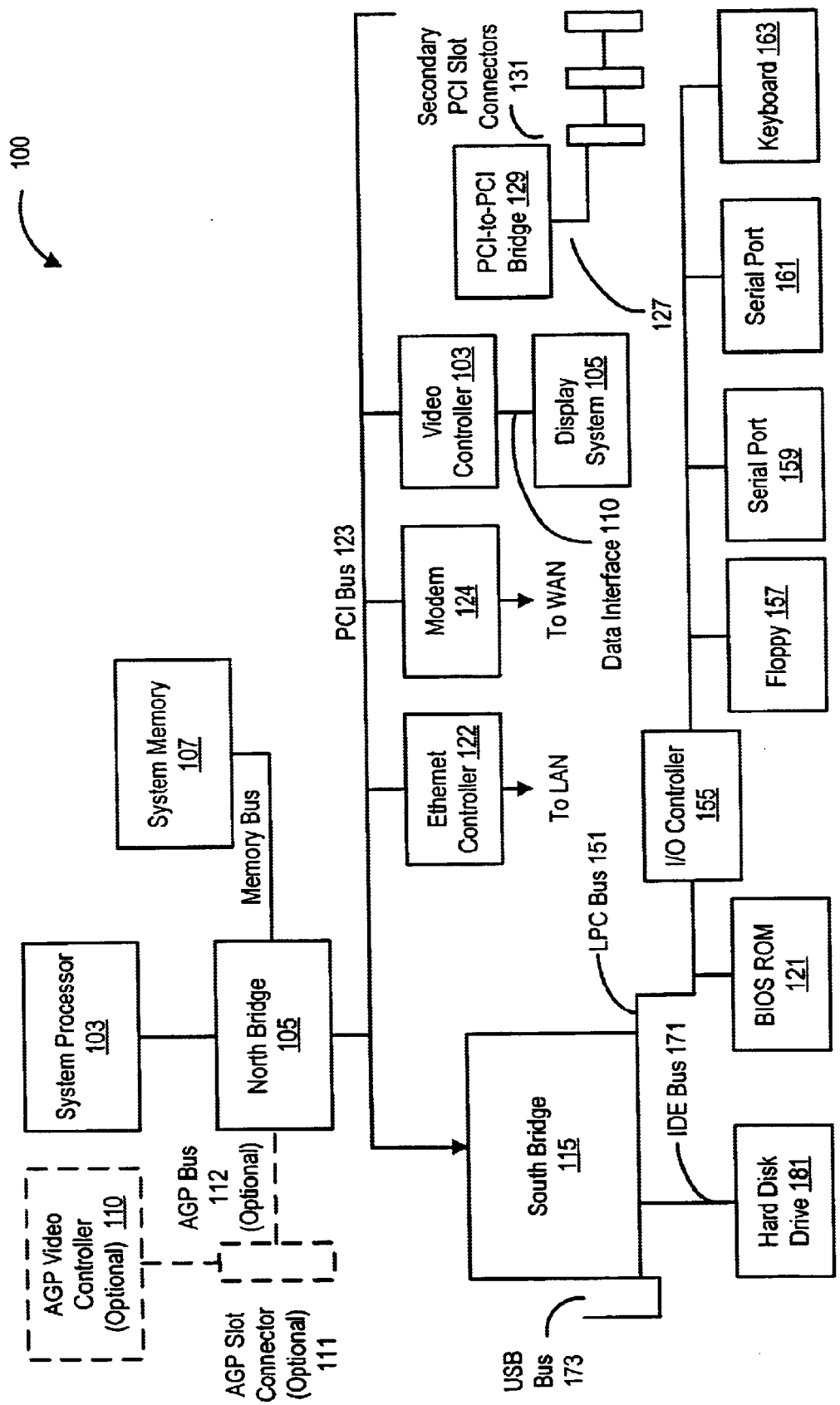
FIG. 1 shows a block diagram of a computer system.

The present invention relates to a method for improving video quality. Typically, material created for an analog monitor (for example a television) is recorded so that each frame has 2 fields which are interlaced. Interlacing draws all of the odd-numbered scan lines first. A second pass draws all of the even-numbered scan lines. These separate scanning passes are called fields. Logically, this corresponds to 2 fields per frame; the first field scans the odd lines, the second field scans the even lines, together the scans fill one frame on a conventional television. Video data recorded for display on a digital monitor is stored in a progressive format.

If interlaced, the material may be de-interlaced for display in a computer monitor or other display device that requires progressive video input. Depending on the amount of motion in the source video, one of two de-interlacing methods is used; the bob method that is best suited for video material that contains a lot of motion and the weave method that is best suited for material that has little motion . If the bob method is used to de-interlace material with a small amount of motion or if the weave method is used to de-interlace material with a large amount of motion, poor quality images result. Also, poor quality images result when either method of de-interlacing is used in material transmitted in a progressive format.

At least 3 companies sell and distribute software that among other functions, performs video de-interlacing of video by the bob or weave method. Intervideo, Ravisent and Mediamatics each have a proprietary technique for de-interlacing with either the bob or the weave method. The present invention teaches a determining which method of de-interlacing to use, if any, based on the amount of motion in the video data. The present invention also teaches changing de-interlacing methods if indicated by a change in the amount of motion in the video data.

Bob de-interlacing is similar to displaying each field in a frame individually. However, for each field, the overlay rectangle is adjusted vertically upwards and downwards to offset the appearance of picture jittering. The resulting image is half the normal height, so it must be magnified in the vertical direction. Magnification in the vertical direction would result in an image which appears to jitter up and down. Adding one line to the overlay on the odd fields prevents the jittering effect if the vertical magnification is performed using an interpolator. The bob method of de-interlacing produces 60 (NTSC) progressive frames per second and retains all temporal information from interlaced data. If a video contains motion, bob de-interlacing is the preferred method of de-interlacing. The bob method of de-interlacing works for all sources of interlaced video data, but provides a less crisp image than the weave method of de-interlacing.

When transferring video material that originated in film at 24 frames per second to video at 30 frames per second, additional frames are inserted to the original material. Inserting the additional frames uses a technique known as 3:2 pull down. This technique inserts a redundant field after every 4 original fields to create the required number of fields. Weave de-interlacing removes redundant fields to restore original frames. The weave de-interlacing algorithm also relies on the. MPEG decoder to recognize the 3:2 pattern. The weave de-interlacing algorithm reverses the 3:2 pattern by removing the extra inserted fields, causing all field pairs to come from the same frame. Weave de-interlacing recreates full-framed video displayed at 24 frames per second, just as it was originally sampled using film.

Weave de-interlacing can also be used with material that originated at 30 frames per second that contains little motion. In this case, the MPEG decoder will not detect the 3:2 pattern and will not remove any fields. The progressive frames will be recreated by combining the odd and even consecutive fields. The output progressive video is displayed at 30 frames per second.

The following sets forth a detailed description of a mode for carrying out the invention. The description is intended to be illustrative of the invention and should not be taken to be limiting. The invention may be practiced in several environments such as a set-top box (described below), a Digital Versatile Disk (DVD), compact disk (CD) or a computer system.

FIG. 1 is a block diagram of an example of a computer system. Computer system 101 includes a system processor 103 and a system memory 107 operably coupled to system processor 103 via a Memory Bus, a north bridge circuit 105, and a Host Bus. An example of a system processor is the PENTIUM III processor sold by INTEL™. In one embodiment, north bridge circuit 105 is implemented with the RCC 3.OLE, SERVERSET III chipset sold by the RELIANCE COMPUTER CORPORATIONT™.

Computer system 101 includes a number of computer busses conforming to various computer bus standards that enable system processor 103 to be operably coupled to multiple computer components. Computer bus 123 conforms to the Peripheral Component Interface (PCI) local bus specification, rev. 2.2. Computer bus 123 is operably coupled to system processor 103 via north bridge circuit 105. Located on PCI computer bus 123 are video controller 103, ethernet controller 122, and modem 124, all of which are mounted on a system board (not shown). Display system 105 is operably coupled to video controller 103 via data interface 110. Computer system 101 also includes a secondary PCI computer bus 127 operably coupled to computer bus 123 via a PCI-to-PCI bridge 129. Slot connectors 131 are located on secondary bus 127. Controller 122 allows computer system 101 to be operably coupled to a Local Area Network. Modem 124 allows computer system 101 to be operably coupled to a Wide Area Network, including the internet.

A video controller may be operably coupled to a computer system via other computer busses and/or conform to other video controller standards. For example, the location of a video controller 110 conforming to the Advanced Graphics Port (AGP) Specification is shown in dashed lines in FIG. 1, operably coupled to north bridge 105 via an AGP slot connector 111 and AGP bus 112. With other computer systems, video controller 103 is implemented on an add-in card inserted into a PCI slot connector of connectors 131.

South bridge circuit 115 is located on PCI bus 123. In one embodiment, south bridge circuit 115 is implemented with an OSB4 chipset sold by the RELIANCE COMPUTER CORPORATION™. Other computer components (not shown) may also be operably coupled to PCI busses 123 and 127 including components (not shown) located on computer cards inserted into card slot connectors 131.

Computer system 101 also includes computer bus 151 which conforms to the Low Pin Count (LPC) bus standard. LPC computer bus 151 is operably coupled to system processor 103 via south bridge circuit 115. Operably coupled to LPC computer bus 151 are BIOS ROM 121 and I/O controller 155. BIOS ROM 121 stores system BIOS code. Operably coupled to I/O controller 155 are floppy disk drive 157, serial port 159, mouse 161, and keyboard 163. A hard disk drive 181 is operably coupled to IDE computer bus 171. Hard disk drive 181 stores application and operating system code such as code for operating system 201 and applications 215. Computer system 101 also includes a computer bus 173 conforming to the Universal Serial Bus (USB) standard. Other conventional computer components (not shown) may be coupled via the computer busses and may be located either on computer cards or mounted to a system board of computer system 101.

Figure 2:
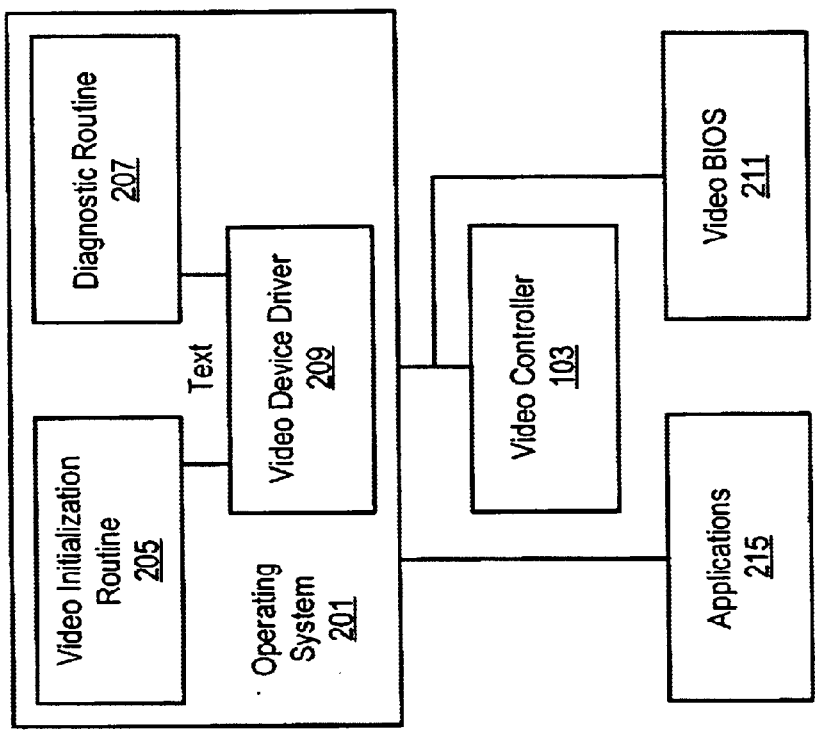
FIG. 2 shows a block diagram of an example of a software architecture for a computer system.

FIG. 2 is an example of a software architecture for a computer system. Operating system 201 is implemented with operating system code executed by a system processor (e.g., 103 in FIG. 1) of a computer system. An example of an operating system is WINDOWS 98™ by MICROSOFT. Operating system 201 includes a video device driver 209 for performing interface operations with video controller 103. In performing interface operations, device driver 209 accesses video BIOS 211. Video device driver 209 provides video data to video controller 203 for display on display 125. Video data can be generated by applications 215 or by other routines of operating system 201. Operating system 201 also includes a video initialization routine 205 that performs operations during the startup of the computer system. Video initialization routine 205 implements the information received in the EDID structure during the startup of the computer system.

Figure 3:
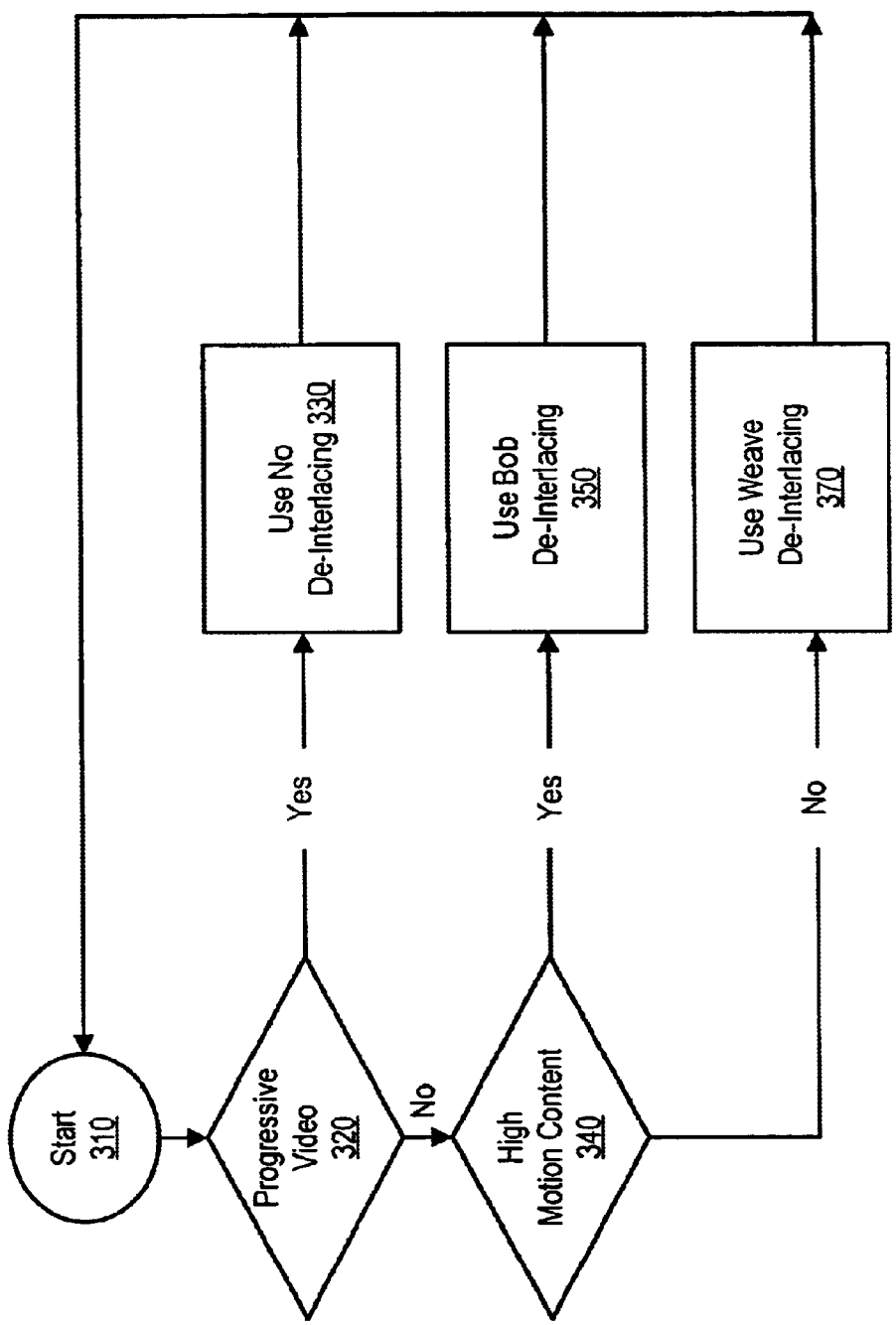
FIG. 3 shows a block diagram of an example of a software architecture for the present invention.

FIG. 3 is an example of the software architecture to implement the present invention. In event 320, the software routine detects material encoded in a progressive format. In event 330 the invention determines if the digital data is received in a progressive format. If the video data is received in a progressive format then it is displayed in the progressive format, without de-interlacing. But if the video data is received in an interlaced format and contains a significant amount of motion, as determined in 340, the data is de-interlaced using bob de-interlacing 350. If the video is interlaced and does not contain a lot of motion, as determined in 340, the data is de-interlaced using weave de-interlacing 370. The invention continues to determine if the video is progressive, or interlaced and the amount of motion it contains.

The magnitude of motion vectors signifies the amount of motion between decoded video frames and the number count signifies the distribution of such motion throughout the video picture. The weave method of de-interlacing is preferable for static scenes or scenes with little motion. The bob method of de-interlacing is better suited for scenes containing more motion. The decision to change from the bob method of de-interlacing to the weave method of de-interlacing depends on the amount of motion in the frame. When a given motion threshold is exceeded, the invention changes from the weave method of de-interlacing to the bob method. When the amount of motion falls below a predetermined level the invention changes the de-interlacing technique form the bob method to the weave method.

Examples of video scenes that are either static or contain little motion include movie opening title and credit scenes, slow camera pans of still life or panoramic scenes of a static background. In theory if there is no text animation both motion vector size and count are zero. For example, in the opening title and closing credits of a movie, both motion vector size and count are zero. But in practice film transfer or video encoding artifacts may cause the presence of a very small number of motion vectors with large magnitudes.

In comparison if the credits are rolling from the bottom of the screen to the top, the number motion vectors will be comparatively large but the magnitude will be small. In comparison in a slow camera pan of a non-moving, non-homogeneous background, the count of motion vectors will be at its maximum since every single pixel on the screen is moving. In this circumstance the magnitude of the motion vectors will be small.

When the scene includes a static background with a small region of motion the number of motion vectors is small. The motion vectors are localized to the regions of the picture that there is motion and the size of them can be small or large.

The maximum vector number is different depending on the frame size of the video format used. The maximum number of motion vectors in a 720×480 pixel DVD video frame is 5400. Each motion vector is associated with only one 8×8 pixel macroblock. High definition television and other display formats will have a different frame size and therefore will have a different number of motion vectors. For DVD, each 8×8 pixel macroblock of a 720×480 pixel frame will be in motion if the vector number is 5400. The maximum permissible size of a motion vector in the same DVD 720×480 pixel video frame is 1790 half pels and signifies a macroblock that moved from the upper left corner to the lower right corner of the frame or the lower left corner to the upper right corner of the frame.

Figure 4:
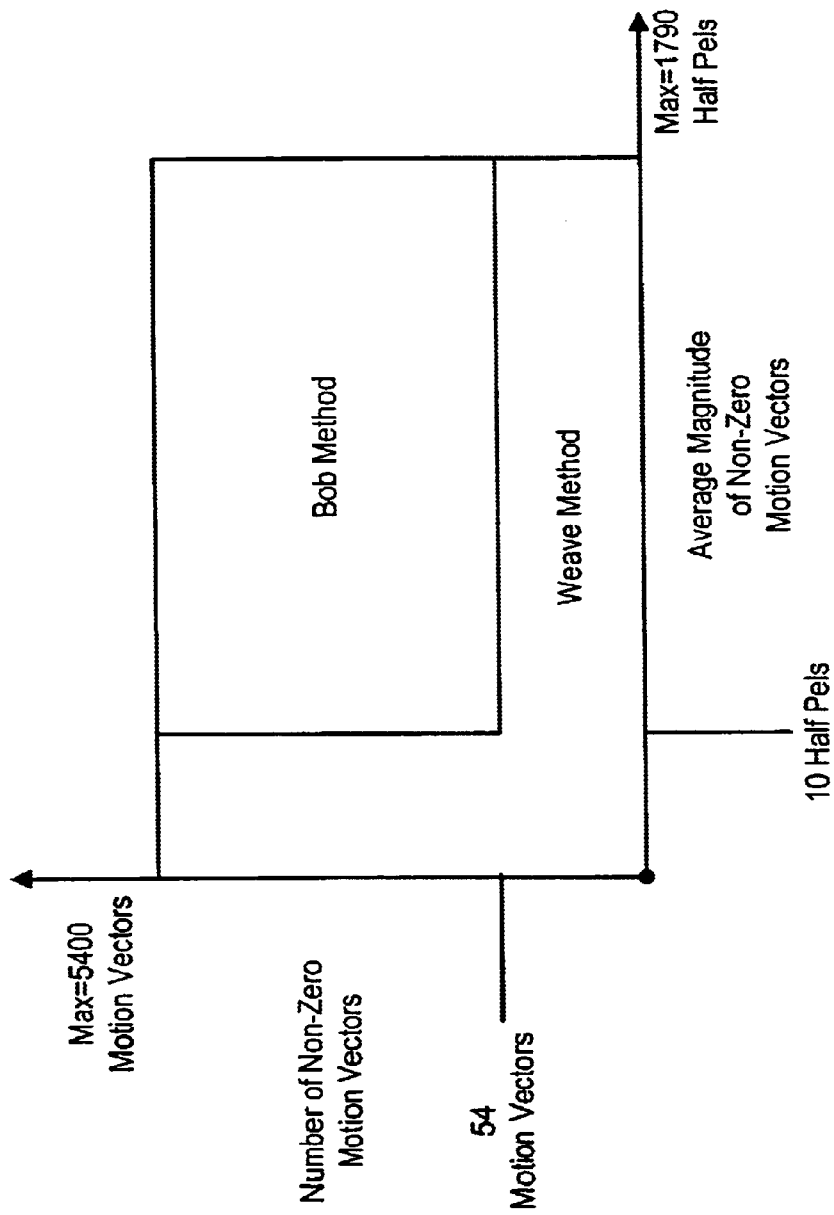
FIG. 4 shows a graphical representation of a motion vector threshold used to change from the bob format of de-interlacing to the weave format of de-interlacing.

One embodiment of the present invention sets the motion vector size threshold to 10 half pels and the count threshold to 1% of the full range, or 54 motion vectors. The thresholds are shown in FIG. 4. FIG. 4 also shows the preferred de-interlacing method for each region of the graph. The invention also allows setting the count and size thresholds at different levels.

An Embodiment of the Invention

The invention may also be practiced in other environments including a DVD or video cassette recorder playing digital data which is displayed on a digital television. Cable service providers transmit digital signals which are received by a set-top box as described below.

Set-top receivers typically have several interfaces, including: high-speed multimedia interfaces, modems, RS 232 ports, TV/VCR interfaces, remote controls and IR blasters. Set-top receivers communicate with televisions and video recorders through output ports that typically are specific to individual vendor's products. High-speed multimedia interfaces allow communication with devices such as camcorders and digital video devices.

A modem allows return communication with the service provider and facilitates interactive services. Modems are used to send requests to servers on the Internet, enable users to send email and other services such as video-on-demand. The Multimedia Cable Network System (MCNS) has developed a standard for communications by a modem over a cable network. The standard, Data Over Cable System Interface Specification (DOCSIS) allows Internet services to be offered to PC users through a digital television modem.

A remote control may be used to change channels on the set-top receiver. A remote control may also execute a navigational system and start an installation menu for configuring the set-top receiver. Similar to a remote control, an IR blaster allows a user to control a television and set-top receiver from rooms other than the room in which the television and set-top receiver are located. An IR blaster transmits a signal compatible with a remote control which connects directly to a set-top receiver.

A set-top receiver incorporates an operating system (OS) which allows the unit to function. Operating systems allocate and control the use of the CPU, control data transfers, manage computer memory, control communications between computers and manage file systems and data storage. The kernel layer of an operating system is stored in read only memory ("ROM") and will be loaded first when the system is switched-on. The kernel allows a set-top receiver to execute different sections of a program and different programs simultaneously. A layer identified as a loader is also included in a set-top receiver. The loader allows the user to download programs built into the memory of the set-top receiver. A typical OS also includes software drivers to control hardware peripherals. Finally, a set-top receiver operating system includes Application Program Interfaces (APIs) specific to a set-top operating system environment. APIs are necessary to write applications for a specific operating system. Both OS and the API are transparent to the user.

Figure 5:
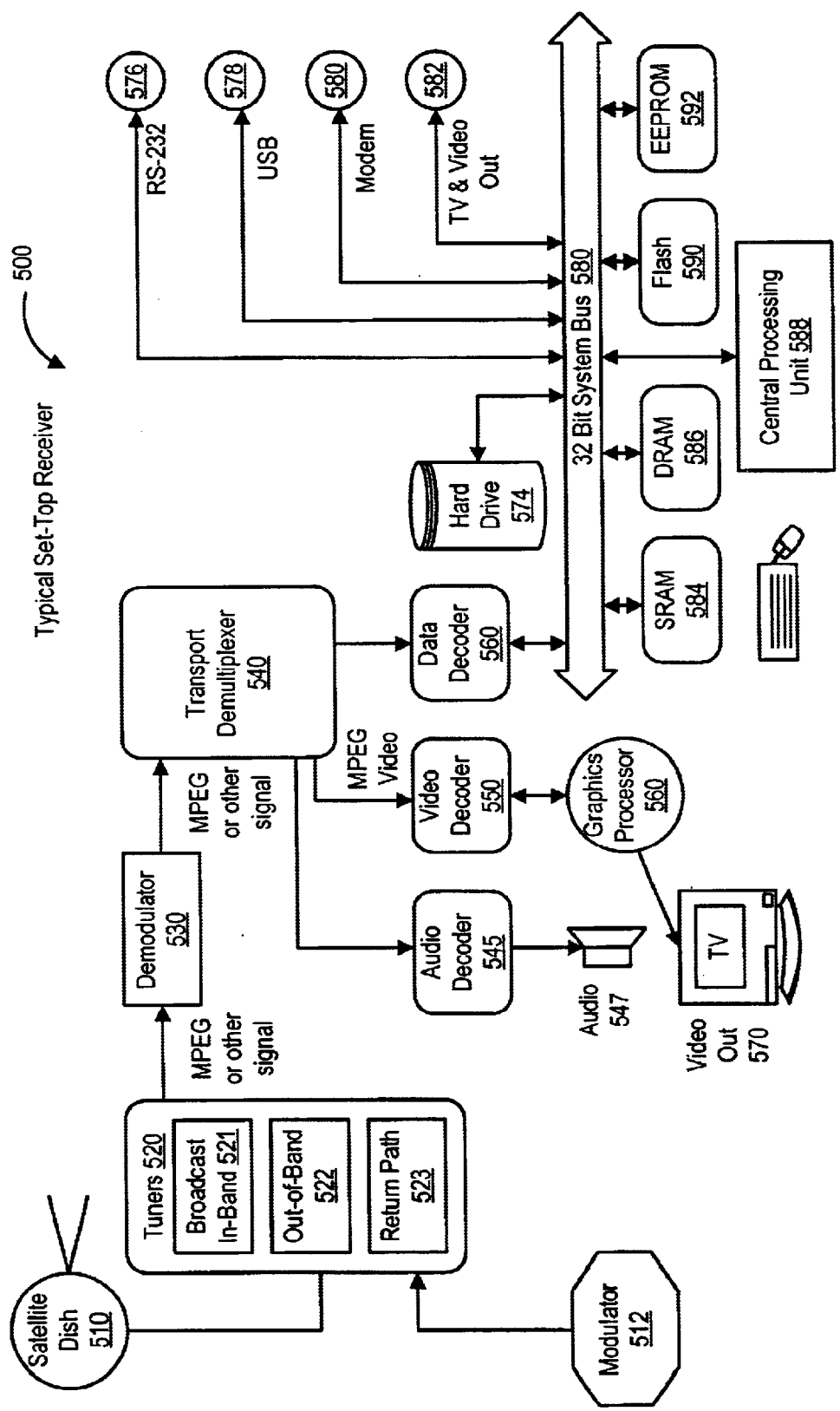
FIG. 5 shows a block diagram depicting the components of a typical set-top receiver.

FIG. 5 is a block diagram illustrating an example architecture of a set-top receiver. In this example, satellite dish 510 receives a signal from the service provider. The signal is transmitted to tuner module 520 containing broadcast in-band tuner 521 and out-of-band tuner 522. Broadcast in-band tuner 521 isolates a channel from a multiplex of channels and converts the channel to baseband. Out-of-band tuner 522 is used to facilitate transfer of data between the service provider and the set-top receiver. Out-of-band tuner 522 is used to provide consumers with interactive services. Tuner module 520 also contains return path 523, allowing the user to send data to the service provider. Modulator 512 converts the incoming signal to digital and delivers the modulated signal to return path 523. From tuner 520, the signal is conveyed in MPEG (or other format) to demodulator 530. Demodulator 530 converts the analog signal to a digital bit stream containing at least video and audio signals. Demodulator 530 transmits the signal to transport demultiplexer 540. Transport demultiplexer 540 conveys the signal to audio decoder 545, video decoder 550 and data decoder 560. Audio decoder 545 conveys the audio signal to speaker 547. Video decoder 550 transmits the signal to graphics processor 560 that sends the signal to monitor 570. Data decoder 560 sends the signal to system bus 572. System bus 572 is electronically coupled to hard drive 574 and incorporates data ports, including RS-232 port 576, USB port 578, modem port 580 and television/video out port 582. System bus 572 is also coupled to SRAM 584, DRAM 586, FLASH memory 590 and EEPROM memory 592. Finally, system bus 580 is electronically coupled to central processing unit (CPU or processor) 588.

While particular embodiments of the present invention have been shown and described, it will be obvious to those skilled in the art that, based upon the teachings herein, further changes and modifications may be made without departing from this invention and its broader aspects, and thus, the appended claims are to encompass within their scope all such changes and modifications as are within the true spirit and scope of this invention. Furthermore, it is to be understood that the invention is solely defined by the appended claims.

What is claimed is:

1. A computer system, comprising:
    a processor;
    an operating system;
    a computer readable medium, wherein the operating system is stored in the computer readable medium, wherein the operating system comprises;
        a first set of instructions, wherein the first set of instructions is configured to detect video data in the progressive format;
        a second set of instructions, wherein the second set of instructions is configured to detect motion in a video data frame by determining whether the average magnitude of non-zero vectors of the frame are greater than a predetermined threshold; and
        a third set of instructions, wherein the third set of instructions is configured to de-interlace video data using the bob de-interlacing method if motion is detected.

2. A computer system, comprising:
    a processor;
    an operating system;
    a computer readable medium, wherein the operating system is stored in the computer readable medium, wherein the operating system comprises;
        a first set of instructions, wherein the first set of instructions is configured to detect video data in the progressive format;
        a second set of instructions, wherein the second set of instructions is configured to detect motion in a video data frame by determining whether the number of non-zero motion vectors is greater than a predetermined threshold; and
        a third set of instructions, wherein the third set of instructions is configured to de-interlace video data using the weave de-interlacing method if motion is not detected.

3. The computer system as recited in claim 2, wherein the video data is read from a compact disk.

4. The computer system as recited in claim 2, wherein the video data is read from a DVD.

5. A display system, comprising:
    a processor;
    an operating system;
    a computer readable medium, wherein the operating system is stored in the computer readable medium, wherein the operating system comprises;
        a first set of instructions, wherein the first set of instructions is configured to detect video data in the progressive format;
        a second set of instructions, wherein the second set of instructions is configured to detect motion in video data by comparing a video data frame's number of non-zero motion vectors and the average magnitude of the non-zero vectors against predetermined thresholds for number of vectors and average magnitude;
        a third set of instructions, wherein the third set of instructions is configured to de-interlace video data using the bob de-interlacing method if motion is detected; and
        a fourth set of instructions, wherein the fourth set of instructions is configured to de-interlace video data using the weave de-interlacing method if motion is not detected.

6. A display system, comprising:
    a processor;
    an operating system;
    a computer readable medium, wherein the operating system is stored in the computer readable medium, wherein the operating system comprises;
        a first set of instructions, wherein the first set of instructions is configured to detect video data in the progressive format;
        a second set of instructions, wherein the second set of instructions is configured to detect motion in a video data frame by determining whether the number of non-zero motion vectors is greater than a predetermined threshold; and
        a third set of instructions, wherein the third set of instructions is configured to de-interlace video data using the bob de-interlacing method if motion is detected.

7. A display system, comprising:
    A television;
    A set-top receiver, the set top receiver further comprising:
        a processor,
        an operating system;
        a computer readable medium, wherein the operating system is stored in the computer readable medium, wherein the operating system comprises;
            a first set of instructions, wherein the first set of instructions is configured to detect video data in the progressive format;
            a second set of instructions, wherein the second set of instructions is configured to detect motion in video data by comparing a video data frame's number of non-zero motion vectors and the average magnitude of the non-zero vectors against predetermined thresholds for number of vectors and average magnitude; and
            a third set of instructions, wherein the third set of instructions is configured to de-interlace video data using the bob de-interlacing method if motion is detected.

8. A method for displaying video images, comprising:
    detecting motion in video data by comparing a video data frame's number of non-zero motion vectors and the average magnitude of the non-zero vectors against predetermined thresholds for number of vectors and average magnitude;

de-interlacing video data using the bob method of de-interlacing if motion is detected; and de-interlacing video data using the weave method if motion is not detected.

9. A method for displaying video images as recited in claim 8, further comprising:

monitoring the format of the digital data being de-interlaced using the bob format and changing the de-interlacing format to the weave format of de-interlacing if motion is not detected.

10. A method for displaying video images as recited in claim 8, further comprising:

monitoring the format of the digital data being de-interlaced using the weave format and changing the de-interlacing format to the bob format of de-interlacing if motion is detected.

11. The method as recited in claim 9, further comprising: displaying video images on a television.

12. The method as recited in claim 9, further comprising: displaying video images on a computer monitor.

13. The method as recited in claim 9, further comprising: reading video data from a video cassette recorder.

14. The method as recited in claim 9, further comprising: reading video data from a DVD.

15. The method as recited in claim 9, further comprising: reading video data from a compact disk.

16. An improved method to display video images, the improvement comprising:

detecting video data without interlacing, displaying video data without interlacing in progressive format;

detecting motion in video data by comparing a video data frame's number of non-zero motion vectors and the average magnitude of the non-zero vectors against predetermined thresholds for number of vectors and average magnitude; and de-interlacing video data containing motion with the bob method of de-interlacing; and de-interlacing video data containing no motion with the weave method of de-interlacing.

17. An improved method to display video images as recited in claim 16, the improvement comprising:

de-interlacing video data with no motion using the weave method of de-interlacing.

18. An improved method to display video images as recited in claim 17, the improvement further comprising:

monitoring video data being de-interlaced using the bob format and changing de-interlacing techniques to the weave format if no motion is detected.

19. An improved method to display video images as recited in claim 18, the improvement further comprising:

monitoring video data being de-interlaced using the weave format and changing de-interlacing formats to the bob format if motion is detected.

20. A display system, comprising:

means to detect video data with motion data by comparing a video data frame's number of non-zero motion vectors and the average magnitude of the non-zero vectors against predetermined thresholds for number of vectors and average magnitude;

means to de-interlace video data with motion using the bob format for de-interlacing; and means to de-interlace video data with no motion using the weave format for de-interlacing.

* * * * *